United States Patent [19]

Hastings

[11] Patent Number: 4,965,296

[45] Date of Patent: Oct. 23, 1990

[54] INTUMESCENT FIRE-RETARDANT AND ELECTRICALLY-CONDUCTIVE COATING MATERIAL

[75] Inventor: Otis H. Hastings, Mahwah, N.J.

[73] Assignee: No Fire Engineering, Inc., Upper Saddle River, N.J.

[21] Appl. No.: 431,755

[22] Filed: Nov. 6, 1989

Related U.S. Application Data

[63] Continuation-in-part of Ser. No. 323,806, Mar. 15, 1989, Pat. No. 4,879,320.

[51] Int. Cl.⁵ ............................................. C08K 21/14
[52] U.S. Cl. ...................................... 523/179; 521/92; 521/91; 521/85; 521/149; 521/154; 521/178; 521/155
[58] Field of Search ............... 523/179; 521/91, 92, 521/85, 149, 178, 155, 906, 907

[56] References Cited

U.S. PATENT DOCUMENTS

| | | | |
|---|---|---|---|
| 3,284,216 | 11/1966 | Kaplan | 252/606 |
| 3,396,129 | 8/1968 | Yeadon | 523/179 |
| 3,422,057 | 1/1969 | Schmidt | 523/179 |
| 3,513,114 | 5/1970 | Hahn et al. | 252/606 |
| 3,849,178 | 11/1974 | Feldman | 252/606 |
| 3,916,057 | 10/1975 | Hatch et al. | 252/606 |
| 3,983,082 | 8/1975 | Pratt et al. | 252/606 |
| 4,018,983 | 4/1977 | Pedlow | 252/606 |
| 4,104,073 | 8/1978 | Koide et al. | 252/606 |
| 4,118,325 | 10/1978 | Becker et al. | 252/606 |
| 4,297,252 | 10/1981 | Caesar et al. | 252/606 |
| 4,381,716 | 5/1983 | Hastings et al. | 109/2 |
| 4,523,528 | 6/1985 | Hastings et al. | 109/42 |
| 4,588,523 | 5/1986 | Tashlick et al. | 252/606 |
| 4,656,095 | 4/1987 | McAllister et al. | 523/179 |
| 4,694,030 | 9/1987 | von Baim | 523/179 |
| 4,708,977 | 11/1987 | Muitel et al. | 523/179 |
| 4,719,249 | 1/1988 | Dietlin et al. | 523/179 |
| 4,743,625 | 5/1988 | Vajo | 523/179 |
| 4,764,539 | 8/1988 | Ladang | 523/179 |
| 4,774,268 | 9/1988 | Marx et al. | 523/179 |
| 4,795,776 | 1/1989 | Milner | 523/179 |
| 4,810,741 | 3/1989 | Kinon | 523/179 |

Primary Examiner—Morton Foelak
Attorney, Agent, or Firm—Ezra Sutton

[57] ABSTRACT

A fire-retardant coating material includes a fluid intumescent material and conductive particles of various sizes dispersed or suspended therein for particular applications. The fluid intumescent material includes a foaming agent, a blowing agent gas source, a carbonific or charring agent, a film-forming binder, a solvent and, in some cases, a pigment or filler. The conductive particles are formed of a substrate and a conductive coating.

30 Claims, 2 Drawing Sheets

INTUMESCENT FIRE-RETARDANT AND ELECTRICALLY-CONDUCTIVE COATING MATERIAL

RELATED APPLICATIONS

This application is a continuation-in-part of application Ser. No. 323,806, filed on Mar. 15, 1989, now U.S. Pat. No. 4,879,320.

FIELD OF THE INVENTION

The present invention relates to a fire-retardant and electrically-conductive composition which includes a fluid intumescent base material and an electrically-conductive material dispersed therein to be used as a protective and electrically-conductive coating for various substrates.

BACKGROUND OF THE INVENTION

Intumescent materials have been known for many years and have been developed to the point where some claim to provide thermal protection up to approximately 2000° F. However, this is not a sufficiently high level of fire protection in a number of environments, including home, office, and industrial applications.

In addition, intumescent materials are not capable of conducting an electric current and becoming part of an electrical circuit. Thus, they are not presently capable of forming part of an alarm system, or being used as an antenna, or preventing electromagnetic interference (EMI), or radio frequency interference (RFI).

Accordingly, it is an object of the present invention to provide an improved fire-retardant and electrically-conductive coating material that is effective at continuously-maintained temperatures as high as 4000° F. and that can be used in a number of different applications to protect various types of substrates.

It is a further object of the invention to provide an improved fire-retardant and electrically-conductive coating material that has a fluid consistency and includes a novel combination of an intumescent material and electrically-conductive material dispersed therein, and wherein the size of the conductive particles may be varied to vary the consistency of the composition from a sprayable fluid to a thick fluid which is applied by a trowel, or articles to be coated may be dipped into the material.

SUMMARY OF THE INVENTION

In the present invention, there is provided a fire-retardant and electrically-conductive coating material which includes a fluid intumescent material and an electrically-conductive material of various sizes dispersed or suspended therein for particular applications. The fluid intumescent material includes a foaming agent, a blowing agent gas source, a carbonific or charring agent, a film-forming binder, a solvent and, in some cases, a pigment or filler. The electrically-conductive material consists of a particle substrate and a conductive coating.

In certain applications, such as housing and building frames to be coated, electrically-conductive particles having a bulk length of at least 1/32" are employed. In other applications, such as commercial, industrial, and transportation vehicles, larger electrically-conductive particles are employed having a bulk length of 1" to 4" or greater to provide a thicker coating consistency, which, in some cases, can be applied by using a trowel.

The larger size particles also increase the amount of conductivity. In applications such as interior finished surfaces and fabrics, milled particles are employed to provide a coating having a consistency which can be applied by painting or spraying and provides a fine or smooth finish, whereas the larger size particles provide a somewhat coarser finish or coating. In this manner, different size particles are employed, depending on the substrate to be protected by the fire-retardant, fire suppressant, and electrically-conductive coating material of the present invention.

The present invention has particular application wherever an electrically-conductive and fire-retardant coating material would be useful. For example, walls, floors, ceilings, or portions thereof may be made electrically conductive so that they can be used in electrical circuits or in alarm and security systems. In addition, the material of the present invention may be used to isolate and safeguard various types of electronic and computer equipment from EMI or RFI in shielded rooms or enclosures. Other applications include coating an entire wall, floor or ceiling, or portions thereof, to form an electrical buss which can be connected to an electrical circuit.

The present invention provides superior thermal protection at continuously-maintained temperatures up to as high as 4000° F.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DESCRIPTION OF PREFERRED EMBODIMENTS OF THE INVENTION

Figure 1:
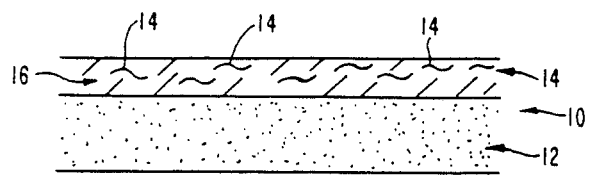
FIG. 1 is a diagrammatic illustration of the fire-retardant coating material of the present invention applied to a substrate.

In the present invention, in the preferred embodiment, the fluid intumescent base material consists of the following:

| Compound | Range (by weight) |
| --- | --- |
| Foaming agent, such as mono-ammonium phosphate, diammonium phosphate, ammonium polyphosphate, or potassium tripolyphosphate, or | 10% to 40% |

-continued

| Compound | Range (by weight) |
| --- | --- |
| combinations thereof (in powder form or granules) | |
| Carbonific or charring agent, such as dipentaerythritol (DPE), polyol, or chlorinated paraffin, or combinations thereof (granules) | 4% to 35% |
| Blowing agent gas source, such as melamine resin, urea, or dicyandiamide (granules), or combinations thereof | 5% to 35% |
| Film-forming binder, such as polyvinyl acetate, acrylic resin, vinyl acrylic resin, silicone resin, epoxy, or polyurethane, or combinations thereof | 1% to 50% |
| Solvent, such as water, alcohols, napthas, or aromatic hydrocarbons, or combinations thereof, to produce a fluid consistency | 10% to 60% |
| Pigments, such as $TiO_2$, ZnO, silicates, carbon black, lamp black, phthalocyanine blue or green, fillers, such as $CaCO_3$ or barytes, or combinations thereof | 0% to 40% |

In the present invention, in the preferred embodiment, the electrically-conductive material is formed of a substrate, preferably a particle, having a coating that is conductive.

The conductive coating may be nickel, copper, aluminum, silver, gold, or any other conductive material, or any combinations thereof. Preferably, the coating thickness is approximately 0.25 microns to 0.65 microns, but this range can vary, depending upon the substrate and particular application.

The substrate may be a fiber, sphere, flake, granule or strand, or combinations thereof, in any desired shape, such as round, oval, rectangular, hexagonal, etc., depending upon the amount of conductivity desired. The substrate material may be glass, fiberglass, graphite, carbon, polyester, metal, metal oxide, mineral, wood, ceramics, or combinations thereof, or any other conductive coatable material. The substrate material may also be a refractory material, such as $Al_2O_3$, $SiO_2$, $Fe_2O_3$, $TiO_2$, $KO_2$, $Na_2O$, or $ZrO_2$.

Depending on the conductive material used, the composition of the present invention has a number of different applications and uses.

For example, when the conductive material is composed of particles, such as milled fibers or small granules, having a diameter in bulk of 1 to 10 microns or greater and a length in bulk of 1 to 35 microns or greater, the composition of the present invention provides a finish which is smooth and is best suited for painting or spraying or applying to many types of surfaces, including interior walls of elevators, houses, office buildings, and vehicles, such as buses, planes, trains, and cars, or the like. Pigment of any desired color may be added for decorating purposes. In addition, the composition composed of such conductive particles has application to all types of fabrics, for use on such things as couches, seats, drapes, carpets, mattresses, furniture, and clothing.

In another embodiment, when the conductive material is composed of larger conductive particles, such as short fibers having a bulk diameter of 1/32" to ½" and a length in bulk of 1/32" to 1", the composition of the present invention is best suited for spraying onto residential structures and any other suitable surfaces.

In still another embodiment, when the conductive particles are composed of larger particles, such as fibers, flakes, spheres, etc., having a bulk diameter of ¼" to ½" and a length in bulk of 1" to 4" and, in some cases, even longer, the composition of the present invention is best suited for industrial and commercial applications, such as structural beams and columns, floors, ceilings, elevator shafts, pipes, electrical cables, ducts, fire doors, stair wells, passageways, boiler rooms, electrical closets, electrical panel boards, and the like.

In other applications, the article to be coated can be dipped into the conductive coating and allowed to harden before it is used.

In the present invention, the combination of conductive material and intumescent base material can be used as an effective fire-retardant material at continuously-maintained temperatures up to as high as 4000° F. There is a preferred range of density for conductive material in the fire-retardant composition of the present invention. For each one gallon of intumescent base material, the range of conductive particles to be used (including spheres, flakes, granules, strands, milled fibers, short fibers, and/or long fibers of any desired shape) is in the range of one (1) ounce to one hundred twenty (120) ounces or greater. In the preferred embodiment of the invention, the range is six (6) ounces to eighty (80) ounces of conductive particles for each gallon of intumescent material. And as explained herein, approximately 30 ounces of conductive particles for each gallon of intumescent material is best suited for a number of uses.

The following examples illustrate the practice of this invention:

EXAMPLE I

A gallon of the intumescent material of the invention was mixed with 15 ounces of milled conductive fibers and 15 ounces of short strand conductive fibers (¼" to ½" bulk length) using an air jet. The composition was applied as a coating to an aluminum sample 4" by 12" having a thickness of 0.060". The composition was applied to a thickness of 0.250" to only one-half of one side of the aluminum sample. Voltmeter leads were placed in contact with the sample, and it was electrically conductive. A propane torch, having a flame temperature of about 2600° F., was applied for at least one (1) hour to the surface of the aluminum sample covered with the composition. The composition swelled and became charred. After the test was concluded, the charred composition was scraped off and the aluminum sample observed. Both surfaces of the aluminum were unaffected by the flame, and the heat did not spread to the uncoated area of the aluminum sample.

EXAMPLE II

A gallon of the intumescent material of the invention was mixed with 30 ounces of milled conductive fibers using an air jet. The composition was applied to an aluminum sample and tested in the same manner as described in Example I, and the same results were achieved as described in Example I.

EXAMPLE III

A gallon of the intumescent material of the invention was mixed with 30 ounces of short conductive fibers (¼" to ½" bulk length) using an air jet. The composition was applied to an aluminum sample and tested in the same manner as described in Example I, and the same results were achieved as described in Example I.

EXAMPLE IV

A gallon of the intumescent material of the invention was mixed with 30 ounces of long conductive fibers (1" to 4" bulk length) using an air jet. The composition was applied to an aluminum sample and tested in the same manner as described in Example I, and the same results were achieved as described in Example I.

EXAMPLE V

A gallon of the intumescent material of the invention was mixed with 15 ounces of short conductive fibers ($\frac{1}{4}$" to $\frac{1}{2}$" bulk length) and 15 ounces of long conductive fibers (1" to 4" bulk length) using an air jet. The composition was applied to an aluminum sample and tested in the same manner as described in Example I, and the same results were achieved as described in Example I.

EXAMPLE VI

A gallon of the intumescent material of the invention was mixed with 15 ounces of milled conductive fibers and 15 ounces of long conductive fibers (1" to 4" bulk length) using an air jet. The composition was applied to an aluminum sample and tested in the same manner as described in Example I, and the same results were achieved as described in Example I.

EXAMPLE VII

A gallon of the intumescent material of the invention was mixed with 10 ounces of milled conductive fibers, 10 ounces of short conductive fibers ($\frac{1}{4}$" to $\frac{1}{2}$" bulk length), and 10 ounces of long conductive fibers (1" to 4" bulk length) using an air jet. The composition was applied to an aluminum sample and tested in the same manner as described in Example I, and the same results were achieved as described in Example I.

FIG. 1 illustrates how the composition 10 of the present invention operates when applied to a substrate 12, such as wood, aluminum, steel, a fabric, or any other usage mentioned herein. Composition 10 includes conductive particles, in the form of fibers 14, in bulk, as described herein in accordance with the present invention, dispersed within or mixed within the intumescent base material 16, as described herein in accordance with the present invention.

Figure 2:
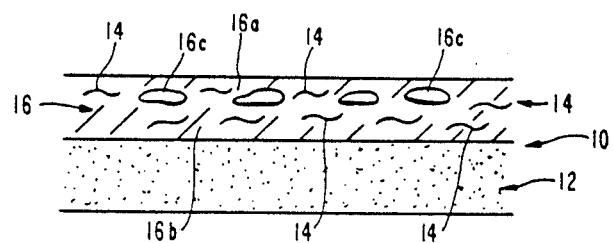
FIG. 2 is a diagrammatic illustration of what happens to the coating material during the initial application of heat.

FIG. 2 illustrates what happens when heat initially reacts with the outer layer 16a of intumescent material and before the heat reaches the inner layer 16b of intumescent material. During this initial stage of heat application, the inner layer 16b is unaffected, but the outer layer 16a swells and expands as a result of air bubbles 16c being formed. These air bubbles 16c build up an outer barrier to protect the substrate 12.

Figure 3:
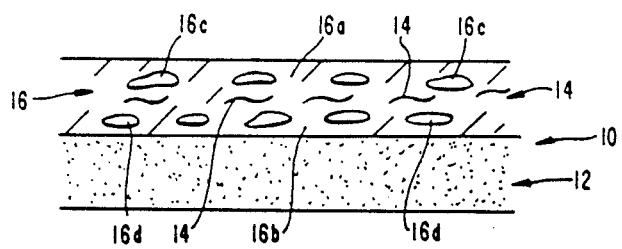
FIG. 3 is a diagrammatic illustration of what happens to the coating material after prolonged application of heat.

FIG. 3 illustrates what happens when the heat builds up and reaches the inner layer 16b. The inner layer 16b starts to swell and expand as a result of air bubbles 16d being formed within the inner layer 16b. These air bubbles 16d build up an inner barrier to protect the substrate 12.

As heat continues to be applied to the composition 10, the air bubbles 16c and 16d increase in number and in size until the air bubbles engage the conductive fibers 14. The fibers 14 then interfere with the air bubbles 16c and 16d continuing to increase in size and thus operate to limit or control their size. Thus, in the present invention, more and smaller air bubbles or air cells are formed, as compared to intumescent materials in the prior art, which typically have no restraints on the increasing size of the air cells being formed. As a result, in the prior art, the air cells eventually become so large that they burst or erupt. Such eruptions interfere with the effectiveness of the intumescent material. This does not happen in the present invention, since conductive fibers 14 limit the size of the inner and outer air cells 16c and 16d, thereby preventing their eruption, so that the composition 10 provides a more effective fire-retardant barrier relative to the substrate 12.

Figure 4:
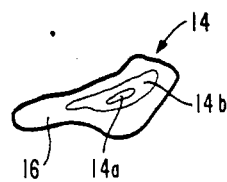
FIG. 4 is a diagrammatic illustration of the conductive material having a substrate, a conductive coating, and being surrounded by intumescent material.
Figure 5:
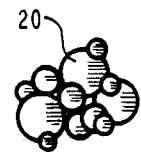
FIG. 5 is a diagrammatic illustration of the substrate of the conductive material being in the form of spheres.
Figure 6:
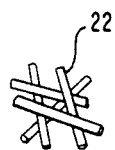
FIG. 6 is a diagrammatic illustration of the substrate of the conductive material being in the form of fibers.
Figure 7:
FIG. 7 is a diagrammatic illustration of the substrate of the conductive material being in the form of flakes.
Figure 8:
FIG. 8 is a diagrammatic illustration of the substrate of the conductive material being in the form of granules.

FIG. 4 diagrammatically illustrates the conductive material 14 in detail, including the inner substrate 14a, the conductive coating 14b, and surrounded by the intumescent material 16. FIG. 5 diagrammatically illustrates the substrate 20 of the conductive material being in the form of spheres which overlap to form a conductive network. FIG. 6 diagrammatically illustrates the substrate 22 of the conductive material being in the form of fibers which overlap to form a conductive network. FIG. 7 diagrammatically illustrates the substrate 24 of the conductive material being in the form of flakes which overlap to form a conductive network. FIG. 8 diagrammatically illustrates the substrate 26 of the conductive material being in the form of granules which overlap to form a conductive network.

Since the conductive coating of the present invention can be used to conduct current, it can be used to apply heat to surfaces onto which it is coated. For example, the conductive coating can be applied to aircraft fuselages, and when current is applied to the coating, it will heat up and melt ice on the fuselage.

Generally, the coating composition of the present invention can be applied to any substrate, and when heat is applied at any temperature in the range of 350° F. and 4000° F. and higher, the coating will expand approximately 2 to 12 times or greater than the original thickness of the coating that is applied and thus provide a superior thermal barrier relative to the substrate being protected, as well as a coating which is electrically conductive, for carrying current, applying heat, or for RFI and EMI shielding.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A fire-retardant and electrically-conductive coating material, comprising:
    (a) a fluid intumescent base material having a foaming agent, a blowing agent, a charring agent, a film-forming binder, and a solvent;
    (b) an electrically-conductive material dispersed in said intumescent material in the range of 1% to 95% by weight;
    (c) said electrically-conductive material consisting of a substrate selected from the group consisting of fibers, spheres, granules, flakes, strands, and combinations thereof, and a coating consisting of an electrically-conductive metal;
    (d) said electrically-conductive material including conductive particles with a bulk length of at least 1/32"; and
    (e) said fire-retardant and electrically-conductive coating material for coating housing and building frames, industrial and commercial structures, transportation vehicles, and the like to render same fire resistant and electrically conductive.

2. A fire-retardant material in accordance with claim 1, wherein said foaming agent is ammonium phosphate or ammonium polyphosphate.

3. A fire-retardant material in accordance with claim 1, wherein said blowing agent is melamine or urea.

4. A fire-retardant material in accordance with claim 1, wherein said charring agent is dipentaerythritol (DPE) or polyol.

5. A fire-retardant material in accordance with claim 1, wherein said intumescent base material includes titanium dioxide ($TiO_2$), an ammonium phosphate compound, melamine resin, DPE, and vinyl acetate or acrylic resin.

6. A fire-retardant material in accordance with claim 1, wherein said substrate includes glass, fiberglass, graphite, carbon, polyester, metal, metal oxide, mineral, wood, ceramics, or combinations thereof, or any other conductive coatable material.

7. A fire-retardant material in accordance with claim 1, wherein said substrate includes a refractory material capable of receiving a conductive coating.

8. A fire-retardant material in accordance with claim 7, wherein said substrate includes one or more of the following refractory materials: $Al_2O_3$, $SiO_2$, $Fe_2O_3$, $TiO_2$, $KO_2$, $Na_2O$, or $ZrO_2$.

9. A fire-retardant material in accordance with claim 1, wherein said electrically-conductive material include a substrate of graphite fibers and a metal coating of nickel.

10. A fire-retardant material in accordance with claim 1, wherein said electrically-conductive material further includes conductive particles in the range of 1 to 35 microns.

11. A fire-retardant material in accordance with claim 1, wherein said electrically-conductive material is in the range of 6 ounces to 80 ounces for each gallon of intumescent material.

12. A fire-retardant material in accordance with claim 1, wherein said electrically-conductive material is in the range of 1 ounce to 120 ounces for each gallon of intumescent material.

13. A fire-retardant material in accordance with claim 1, wherein there are 30 ounces of said electrically-conductive material for each gallon of intumescent material.

14. A fire-retardant material in accordance with claim 1, wherein the conductive particles are round, oval, rectangular, or hexagonal in shape.

15. A fire-retardant and electrically-conductive coating material, comprising:
  (a) a fluid intumescent base material having a foaming agent, a blowing agent, a charring agent, a film-forming binder, and a solvent;
  (b) an electrically-conductive material dispersed in said intumescent material in the range of 1% to 95% by weight;
  (c) said electrically-conductive material consisting of a substrate selected from the group consisting of fibers, spheres, granules, flakes, strands, and combinations thereof and a coating consisting of an electrically-conductive metal;
  (d) said electrically-conductive material including conductive particles with a bulk length of 1 to 35 microns; and
  (e) said fire-retardant and electrically-conductive coating material for coating interior finished surfaces, fabrics, and surfaces requiring a smooth finish to render same fire resistant and electrically conductive.

16. A fire-retardant material in accordance with claim 15, wherein said foaming agent is ammonium phosphate or ammonium polyphosphate.

17. A fire-retardant material in accordance with claim 15, wherein said blowing agent is melamine or urea.

18. A fire-retardant material in accordance with claim 15, wherein said charring agent is dipentaerythritol (DPE) or polyol.

19. A fire-retardant material in accordance with claim 15, wherein said intumescent base material includes titanium dioxide ($TiO_2$), an ammonium phosphate compound, melamine resin, DPE, and vinyl acetate or acrylic resin.

20. A fire-retardant material in accordance with claim 15, wherein said substrate includes glass, fiberglass, graphite, carbon, polyester, metal, metal oxide, mineral, wood, ceramics, or combinations thereof, or any other conductive coatable material.

21. A fire-retardant material in accordance with claim 15, wherein said substrate includes a refractory material capable of receiving a conductive coating.

22. A fire-retardant material in accordance with claim 21, wherein said substrate includes one or more of the following refractory materials: $Al_2O_3$, $SiO_2$, $Fe_2O_3$, $TiO_2$, $KO_2$, $Na_2O$, or $ZrO_2$.

23. A fire-retardant material in accordance with claim 15, wherein said electrically-conductive material include a substrate of graphite fibers and a metal coating of nickel.

24. A fire-retardant material in accordance with claim 15, wherein said electrically-conductive material further includes conductive particles with a bulk length of at least 1/32".

25. A fire-retardant material in accordance with claim 15, wherein said electrically-conductive material is in the range of 6 ounces to 80 ounces for each gallon of intumescent material.

26. A fire-retardant material in accordance with claim 15, wherein said electrically-conductive material is in the range of 1 ounce to 120 ounces for each gallon of intumescent material.

27. A fire-retardant material in accordance with claim 15, wherein there are 30 ounces of said electrically-conductive material for each gallon of intumescent material.

28. A fire-retardant material in accordance with claim 15, wherein the conductive particles are round, oval, rectangular, or hexagonal in shape.

29. A fire-retardant material in accordance with claim 1, wherein said electrically-conductive metal is nickel, copper, aluminum, silver, gold or combinations thereof.

30. A fire-retardant material in accordance with claim 15, wherein said electrically-conductive metal is nickel, copper, aluminum, silver, gold or combinations thereof.

* * * * *